No. 882,699. PATENTED MAR. 24, 1908.
H. S. LATSHAW.
ELECTRICAL RECEPTACLE FOR PLANTS.
APPLICATION FILED JAN. 24, 1906.
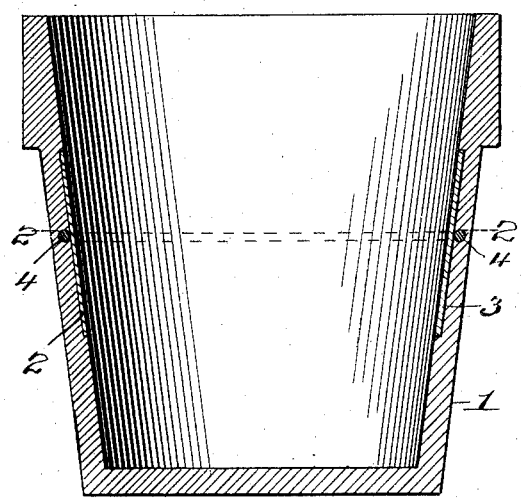
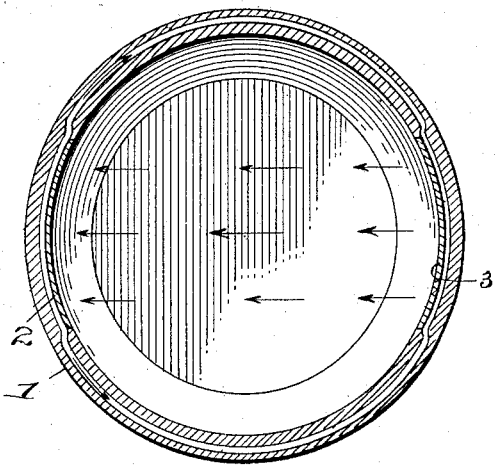
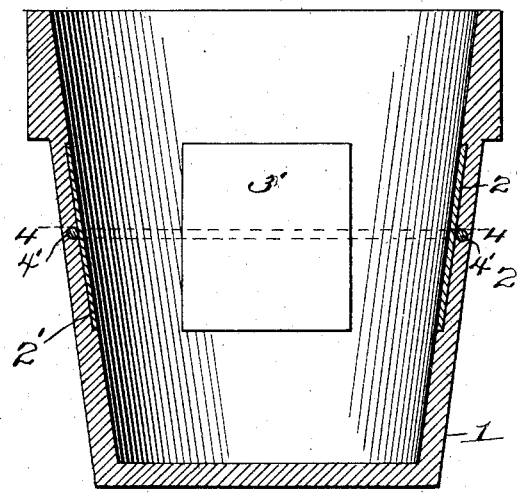
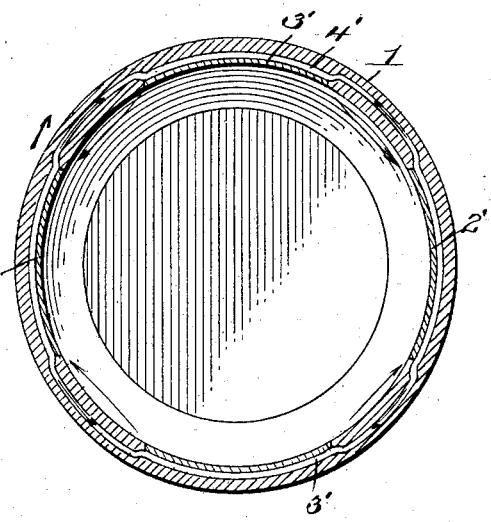
Witnesses
Inventor
Harry S. Latshaw,
By Mason, Fenwick, Lawrence
Attorneys

UNITED STATES PATENT OFFICE.

HARRY S. LATSHAW, OF JERSEY SHORE, PENNSYLVANIA.

ELECTRICAL RECEPTACLE FOR PLANTS.

No. 882,699.  Specification of Letters Patent.  Patented March 24, 1908.

Application filed January 24, 1906. Serial No. 297,698.

*To all whom it may concern:*

Be it known that I, HARRY S. LATSHAW, a subject of the King of Great Britain, residing at Jersey Shore, in the county of Lycoming and State of Pennsylvania, have invented certain new and useful Improvements in Electrical Receptacles for Plants; and I do hereby declare the following to be a full, clear, and exact description of the invention, such as will enable others skilled in the art to which it appertains to make and use the same.

This invention relates to improvements in electrical receptacles employed for holding and also assisting the growth of a plant.

The object of the invention is to provide means whereby a plant may be subjected to a constant electrical and magnetic action, the part of the plant subjected to such action being the roots.

With this and other objects in view, the invention consists of certain novel constructions, combinations, and arrangements of parts, as will be hereinafter fully described, illustrated in the accompanying drawings, and more particularly pointed out in the claims hereto appended.

In the drawings: Figure 1 is a vertical, sectional view of a receptacle, preferably a flower pot, constructed in accordance with the present invention. Fig. 2 is a horizontal, sectional view taken on line 2, 2, Fig. 1. Fig. 3 is another embodiment of the present invention. Fig. 4 is a horizontal view taken on line 4, 4, Fig. 3.

Referring to the drawings, 1 designates the body of a suitable receptacle preferably of the ordinary flower pot type. The body 1 is provided with plates 2 and 3, carried by the walls. In the present instance, these plates are countersunk in recesses formed in the inner surface of the body 1. The plate 2 is preferably copper, while the plate 3 is preferably zinc. The plates 2 and 3 constitute the negative and positive elements, respectively, of a cell. The plates 2 and 3 are connected by a conductor, as for instance, a wire 4, which is embedded in the walls of body 1, and engages, preferably, the back of the plates 2 and 3. When soil is placed in the receptacle, this constitutes the electrolyte, and the effect of the electrical action is manifested through the electrolyte. While the wire 4 is continuous around the receptacle, it will be understood that some of the current returning to the positive element starts from the negative element at opposite sides and enters the positive element at its sides, and thence passes across to the negative element. By this means, the roots of the plant or plants are treated or subjected to a constant electrical and magnetic action, for the purpose of affecting the vegetable growth within the area of the walls of the receptacle.

It will be noted that any body of earth may be subjected to the electrical or magnetic action by placing the negative and positive elements as hereinbefore described.

In Figs. 3 and 4, I have shown another embodiment of the invention, in which I preferably employ a plurality of copper plates 2', 2' and zinc plates 3', 3'. All of the plates are connected by means of a wire 4', which is embedded in the body 1, similar to wire 4. The current passes through the soil from each positive element to the two contiguous negative elements, thereby forming a plurality of pairs which will give the plant or plants a uniform development which has been found from practical experience to not be the case with only a negative and a positive element, as it has been found that the tendency of the plant subjected to the action of the electrical current is to develop in a line transverse to the location of the zinc and copper plates, when arranged in a receptacle as illustrated in Figs. 1 and 2.

From the foregoing description, it will be noted that the receptacles hereinbefore described constitute a cell, the electrolyte of which is the soil in which the plant grows. It will also be obvious that while I have described the receptacle, preferably illustrated in the drawings as a flower pot, said receptacle constitutes inclosing means for a given amount of soil which is subjected to an electrical or magnetic action.

The receptacle 1 is formed of any suitable non-conductive material, as for instance, clay or cement, so that, while the current may pass through the soil from one to another of the countersunk plates, it will only pass from the positive poles of the negative element to the negative poles of the positive element through the metallic conductor.

What I claim is:

1. In an electric receptacle for plants, the combination with a body of a negative and positive element located within said receptacle and a metallic conductor passing entirely around said receptacle and connected to each of said elements for forming a return path for an electrical current.

2. An electrical receptacle comprising a body provided with a negative and a positive element surrounded by said body, and a metallic conductor embedded within the said body, and connecting the negative and positive elements.

3. An electrical receptacle for plants, comprising a body provided with plates countersunk in its walls, said plates being positioned within said body and comprising a negative and a positive element, and a metallic conductor connecting said plates.

4. An electrical receptacle for plants comprising a body, plates constituting a negative and a positive element countersunk in the inner side of the walls of said body, and a wire embedded in and extending entirely around the walls of said body in engagement with said plates.

5. In an electrical receptacle for plants, the combination with a body constituting inclosing means, of a positive and negative plate located in contact with the walls of said body and a wire connected to the back of each plate for forming a path for the flow of electrical current.

In testimony whereof I affix my signature in presence of two witnesses.

HARRY S. LATSHAW.

Witnesses:
CHAS. H. FREEMAN,
OLIVER A. CARY.